US004001722B2

United States Statutory Invention Registration [19]

[11] Reg. Number: H1722

Goode et al.

[45] Published: Apr. 7, 1998

[54] PROCESS FOR PRODUCING POLYPROPYLENE IMPACT BLOCK COPOLYMERS

[76] Inventors: Mark Gregory Goode, 17 Meadowbrook Cir., Hurricane, W. Va. 25526; Kersten Anne Erickson, 872 Roxalana Hills Dr., Dunbar, W. Va. 25064; James Douglas McCullough, Jr., 754 Last Arrow Dr., Houston, Tex. 77079

[21] Appl. No.: 436,808

[22] Filed: May 5, 1995

[51] Int. Cl.[6] ..... C08F 4/649

[52] U.S. Cl. ..... 525/323

[58] Field of Search ..... 525/323, 240; 526/65, 249, 259

[56] References Cited

U.S. PATENT DOCUMENTS

| | | | |
|---|---|---|---|
| 4,855,371 | 8/1989 | Job | 526/124 |
| 4,882,380 | 11/1989 | Ficker et al. | 525/53 |
| 4,942,148 | 7/1990 | Furuhashi | 502/115 |
| 4,971,936 | 11/1990 | Wilson | 502/124 |
| 5,037,905 | 8/1991 | Cummings et al. | 526/74 |
| 5,093,415 | 3/1992 | Brady, III et al. | 525/53 |
| 5,162,277 | 11/1992 | Job | 502/124 |
| 5,218,052 | 6/1993 | Cohen | 525/240 |
| 5,219,960 | 6/1993 | Tamano | 526/65 |
| 5,294,581 | 3/1994 | Job | 502/124 |
| 5,414,063 | 5/1995 | Seeger | 526/88 |

FOREIGN PATENT DOCUMENTS

| | | |
|---|---|---|
| 2112712 | 7/1994 | Canada . |
| 0509169A1 | 10/1992 | European Pat. Off. . |
| 0522784A1 | 1/1993 | European Pat. Off. . |
| 0601496A1 | 6/1994 | European Pat. Off. . |

*Primary Examiner*—Charles T. Jordan
*Assistant Examiner*—Meena Chelliah
*Attorney, Agent, or Firm*—Andrew R. Reiskind

[57] ABSTRACT

A process for producing a polypropylene impact copolymer by polymerizing propylene and optionally a monomer selected from the group consisting of ethylene, butene-1, pentene-1, and hexene-1 in a first reactor in the presence of a titanium, magnesium, halogen, and a inside electron donor catalyst, an organoaluminum cocatalyst, and an outside electron donor, $R^1{}_2Si(OR^2)_2$, to produce a first polymer which enters a second reactor where it is reacted with propylene and another monomer in the absence of additional catalyst and in the presence of a third electron donor, $Si(OR^3)_4$ is provided.

11 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PRODUCING POLYPROPYLENE IMPACT BLOCK COPOLYMERS

FIELD OF THE INVENTION

The present invention relates to a process for the production of polypropylene copolymers having improved impact strength and stiffness.

BACKGROUND OF THE INVENTION

For applications requiring a high level of low temperature impact strength, so-called "impact polypropylene copolymers" are used. These polypropylene copolymers are usually manufactured by the incorporation of an elastomeric impact modifier, e.g., an ethylene/propylene copolymer rubber (EPR), into a homopolymer matrix either by blending the homopolymer or by producing the copolymer in situ.

When prepared in situ, the polymerization catalyst is a combination of an organoaluminum component with a solid second component containing magnesium, titanium and halogen. The activity of such catalysts, as well as their ability to produce stereoregular polymers, is enhanced by incorporating an electron donor (Lewis base) into the solid second component. The addition of an electron donor to the catalyst system independently of the solid second component is also known to enhance the stereo-specific character of the catalyst. When the electron donor is added separately from the solid second component, it may be complexed in whole or in part with the organoaluminum component. When added separately from the second catalyst component, the electron donor is sometimes referred to as a selectivity control agent or an outside electron donor. The electron donor incorporated into the second catalyst component is referred to as an inside electron donor.

Impact polypropylene copolymers can be produced in slurry polymerization processes conducted in inert hydrocarbon solvents, bulk polymerization processes conducted in liquefied monomers such as liquefied propylene, and in a gas phase polymerization process in a fluidized bed in a single vessel, but generally, one or more vessels or reactors are connected in series.

In gas phase polymerization, lumps of polymer due to sticking of individual polymer particles to one another can form due to inadequate heat removal from the polymerizing particles which allows the polymer particle to exceed its sticking temperature. These small lumps (even if they are not sufficiently large to cause cessation of the polymerization reaction due to plugging of the reactor) tend to be nonhomogeneous and adversely affect the final product by producing gels and "fish eyes" in the as-formed polymer article. This particular problem is exacerbated in impact polypropylene polymerization systems since the polymer formed in the second reactor is generally a lower melting, rubbery polymer which is inherently more sticky; even when maintained below its sticking temperature. Thus, build-up of polymer onto the polymerization vessel tends to take place, and fouling of equipment downstream of vessel can occur. This makes continuous operation of the process difficult and adversely affects the quality of the final polymer product by resulting in gels and "fish eyes" in the product.

U.S. Pat. No. 5,037,905 to Union Carbide Corporation provides a method for inhibiting polymer build-up in a heat exchanger during the gas phase polymerization of alpha-olefins which comprises introducing upstream of the heat exchanger para-ethylethoxybenzoate in an amount sufficient to inhibit polymer build-up. The preferred alpha olefin polymers produced are polypropylene impact copolymers.

EPO 601 496 to Mitsui discloses a process for preparing an olefin polymer comprising the steps of preparing an olefin polymer [I] by polymerizing or copolymerizing an olefin in the presence of a catalyst having a titanium component, an organoaluminum component, and an electron donor component in a first polymerization vessel. In a vessel different from the first, a polymer or copolymer [II] is prepared by allowing polymer [I] and an olefin to coexist in the presence of a second catalyst comprising a titanium component, an organoaluminum component, and a second specific electron donor component. The catalyst may be either different from that present in copolymer [I] or carried into the second reactor with copolymer [I]. Both electron donor components are specific silanes. In the first step the electron donor has the formula $R^1{}_2Si(OR^2)_2$, and an electron donor having the formula $R^1{}_nSi(OR^2)_{4-n}$ where n>0 is employed in the second step.

Canadian Patent Application 2,112,712 to Sumitomo relates to a process for producing an ethylene-propylene block copolymer in the presence of a magnesium, titanium, halogen containing catalyst system, and an organoaluminum compound in two steps. Each step employs a silicon compound. In the first step, the silicon compound is represented by the formula $R^1R^2Si(OR^3)_2$. The silicon compound of the second step has the formula $R^4{}_aSi(OR^5)_{4-a}$.

Accordingly, there is an on-going need to provide a polypropylene impact copolymer having improved impact strength and stiffness without fouling the polymerization reactors or vessels.

SUMMARY OF THE INVENTION

The present invention relates to a process for producing improved impact strength and stiffness polypropylene block copolymers, which process comprises the steps of (1) polymerizing propylene and optionally less than 3 mol % of a monomer selected from the group consisting of ethylene, butene-1, pentene-1, and hexene-1 in a first polymerization reactor under polymerization conditions in the presence of a catalyst system of:

(i) a solid catalyst precursor consisting essentially of magnesium, titanium, halogen, and an inside electron donor, (ii) an organoaluminum cocatalyst, (iii) an outside electron donor of the formula $$R^1{}_2Si(OR^2)_2$$

wherein each $R^1$ is individually a cycloalkyl having 4 to 7 carbon atoms or a substituted or unsubstituted cycloaliphatic group having 4 to 20 carbon atoms and each $R^2$ is individually a hydrocarbon group having 1 to 20 carbon atoms to produce a first polymer; and (2) polymerizing in a second reactor the first polymer obtained in step (1) with propylene and at least one monomer selected from the group consisting of ethylene, butene-1, pentene-1, or hexene-1 in the absence of an additional catalyst system and in the presence of a third electron donor of the formula $$Si(OR^3)_4$$

where each $R^3$ is the same or different and is a hydrocarbon group of 1 to 20 carbon atoms.

DETAILED DESCRIPTION OF THE INVENTION

Figure 1:
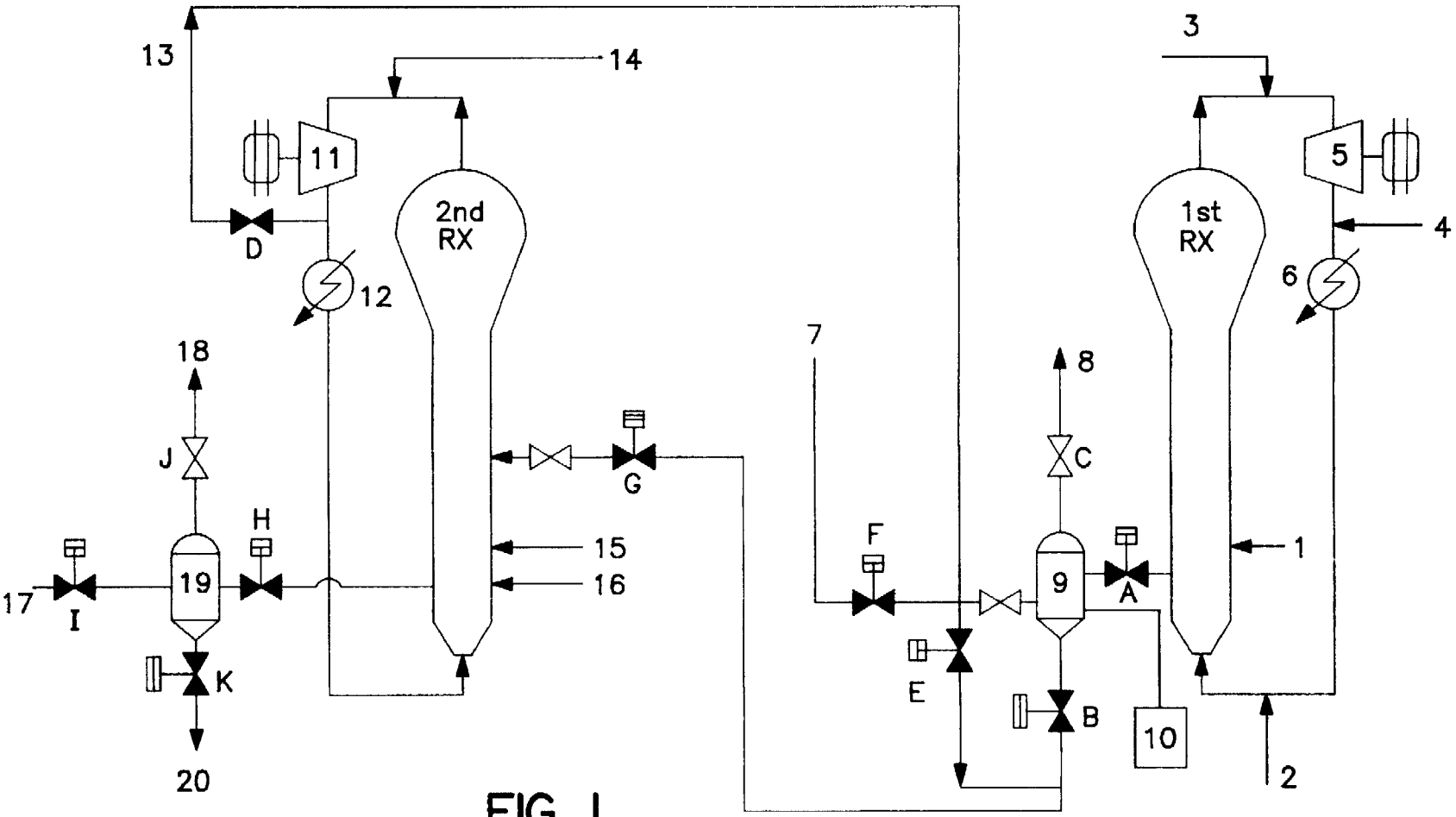
FIG. 1 depicts one embodiment of the reaction system used in the invention.
Figure 2:
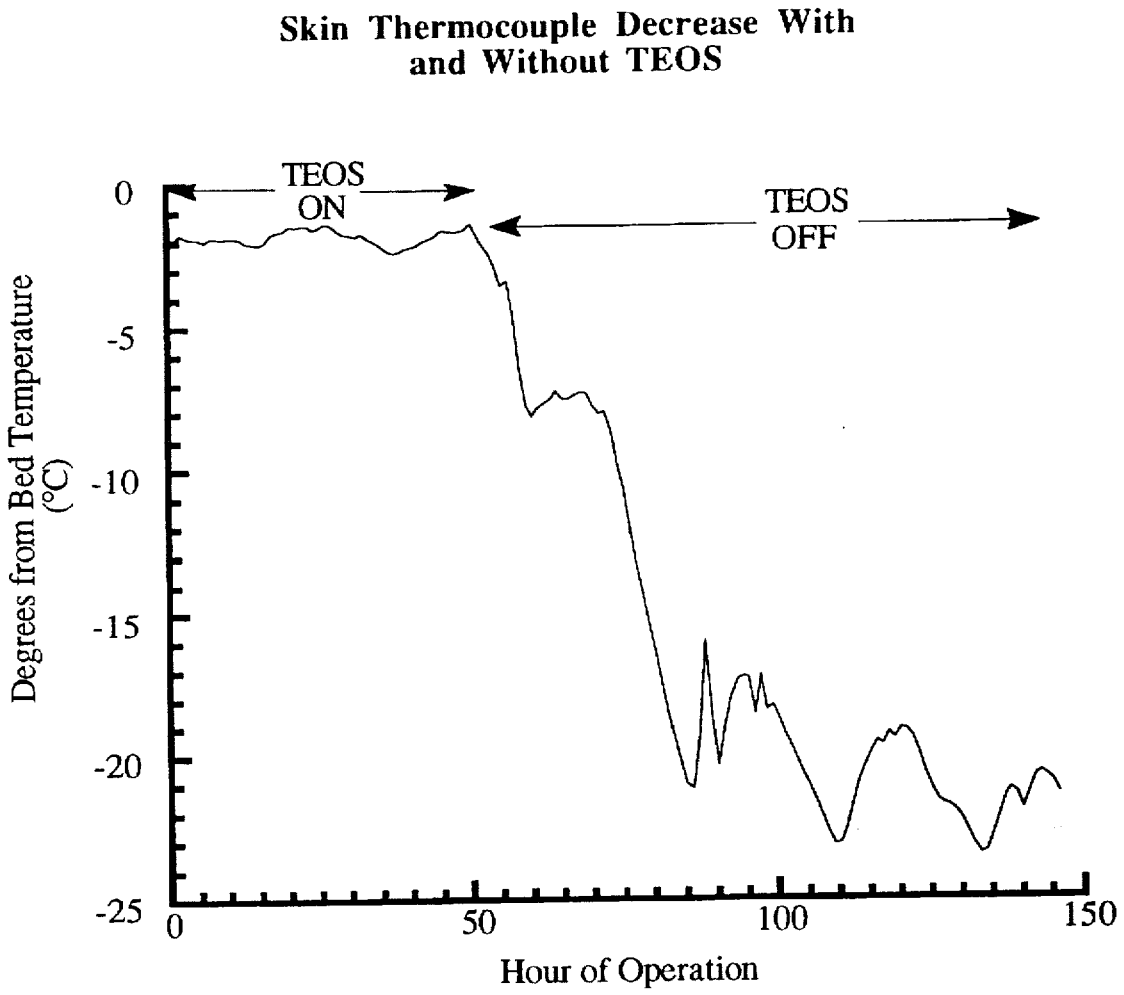
FIG. 2 shows the effect of tetraethoxysilane on the skin thermocouples and the difference in temperature between the bulk bed and the skin thermocouple. A negative value indicates that an insulating layer of polymer is building on the wall of the reactor resulting in fouling, fish-eyes, and/or gel formation.

The solid catalyst precursor of the catalyst system employed in the process of the invention is prepared by halogenating a magnesium compound of the formula MgR'R", wherein R' is an alkoxide, alkyl carbonate or aryloxide group and R" is an alkoxide, alkyl carbonate, aryloxide group or halogen, with a halogenated tetravalent titanium compound in the presence of a halohydrocarbon and a polycarboxylic acid ester containing two coplanar ester groups attached to adjacent carbon atoms.

The magnesium compound employed in the preparation of the solid catalyst component is preferably a magnesium dialkoxide, magnesium alkyl carbonate or a magnesium diaryloxide, most preferably a magnesium dialkoxide. Magnesium compounds containing one alkoxide, one alkyl carbonate and one aryloxide group can also be employed, as well as magnesium compounds containing a halogen in addition to one alkoxide or aryloxide group. The alkoxide groups, when present, most suitably contain from 1 to 8 carbon atoms, preferably from 2 to 6 carbon atoms. The aryloxide groups, when present, most suitably contain from 6 to 10 carbon atoms. When halogen is present, it is preferably present as chlorine.

Among the magnesium dialkoxides and diaryloxides which can be employed are magnesium diethoxide, magnesium diisopropoxide, magnesium di-n-butoxide, magnesium diphenoxide, magnesium dinaphthoxide and ethoxy magnesium isobutoxide. Magnesium diethoxide is particularly preferred.

Among the magnesium alkyl carbonates which can be employed are magnesium ethyl carbonate, magnesium butyl carbonate and magnesium methyl carbonate. Magnesium ethyl carbonate is particularly preferred.

Illustrative of magnesium compounds containing one alkoxide and one aryloxide group which can be employed are ethoxy magnesium phenoxide and naphthoxy magnesium isoamyloxide.

Suitable alkoxy and aryloxy magnesium halides include ethoxy magnesium bromide, isobutoxy magnesium chloride, phenoxy magnesium iodide, cumyloxy magnesium bromide and naphthoxy magnesium chloride.

The halogenated tetravalent titanium compound employed to halogenate the magnesium compound must contain at least two halogen atoms, and preferably contains four halogen atoms. Most preferably these halogen atoms are chlorine atoms. However, titanium compounds containing up to two alkoxy and/or aryloxy groups can also be employed. The alkoxy groups, when present, most suitably contain from 1 to 8 carbon atoms, preferably from 2 to 6 carbon atoms. The aryloxy groups, when present, most suitably contain from 6 to 12 carbon atoms, preferably from 6 to 10 carbon atoms. Examples of suitable alkoxy- and aryloxy-titanium halides include diethoxy titanium dibromide, isopropoxy titanium triiodide, dihexoxy titanium dichloride, and phenoxy titanium trichloride.

Halogenation of the magnesium compound with the halogenated tetravalent titanium compound, as noted, is conducted in the presence of a halohydrocarbon and a polycarboxylic acid ester containing two coplanar ester groups attached to adjacent carbon atoms. If desired, an inert hydrocarbon diluent or solvent may also be present, although this is not necessary.

The halohydrocarbon employed may be aromatic, aliphatic, or alicyclic.

Aromatic halohydrocarbons are preferred, particularly those containing from 6 to 12 carbon atoms, and especially those containing from 6 to 10 carbon atoms. Preferably such halohydrocarbons contain 1 or 2 halogen atoms, although more may be present if desired. Most preferably the halogen is present as chlorine. Suitable aromatic halohydrocarbons include chlorobenzene, bromobenzene, dichlorobenzene, dichlorodibromobenzene, chlorotoluene, dichlorotoluene, chloronaphthalene, and the like. Chlorobenzene and dichlorobenzene are preferred, especially the former.

The aliphatic halohydrocarbons which can be employed suitably contain from 1 to 12 carbon atoms. Preferably such halohydrocarbons contain from 1 to 9 carbon atoms and at least 2 halogen atoms. Most preferably the halogen is present as chlorine. Suitable aliphatic halohydrocarbons include dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, and the like. Carbon tetrachloride and trichloroethane are preferred.

The alicyclic halohydrocarbons which can be employed suitably contain from 3 to 12 carbon atoms. Preferably such halohydrocarbons contain from 3 to 9 carbon atoms and at least 2 halogen atoms. Most preferably the halogen is present as chlorine. Suitable alicyclic halohydrocarbons include dibromocyclobutane and trichlorocyclohexane.

The polycarboxylic acid ester employed in the preparation of the solid catalyst component serves as an inside electron donor and is present in the final product as well as during its preparation. Suitable esters are characterized by a molecularly rigid structure wherein two ester groups are attached to adjacent carbon atoms of the molecule and lie in a single plane. Such esters include:

(a) polycarboxylic acid esters containing two ester groups which are attached to ortho carbon atoms of a monocyclic or polycyclic aromatic ring, each of said ester groups being further linked to a branched or unbranched chain hydrocarbon radical, (b) polycarboxylic acid esters containing two ester groups which are attached to vicinal carbon atoms of a non-aromatic monocyclic or polycyclic ring and which lie in a syn configuration with respect to each other, each of said ester groups being further linked to a branched or unbranched chain hydrocarbon radical, and (c) polycarboxylic acid esters containing two ester groups which are attached to vicinal double bonded carbon atoms of an unsaturated aliphatic compound and which lie in a syn configuration with respect to each other, each of said ester groups being further linked to a branched or unbranched chain hydrocarbon radical.

The polycarboxylic acid esters employed in the preparation of the solid catalyst component are derived from a suitable polycarboxylic acid and a monohydric alcohol having a linear hydrocarbon moiety which may be branched or unbranched. Suitable polycarboxylic acids include:

(a) monocyclic or polycyclic aromatic compounds containing two carboxyl group which are attached to ortho carbon atoms of the ring structure, (b) monocyclic or polycyclic non-aromatic compounds containing two carboxyl groups which are attached to vicinal carbon atoms of the ring structure and which lie in a syn configuration with respect to each other, or (c) unsaturated aliphatic compounds containing two carboxyl groups which are attached to vicinal double bonded carbon atoms and which lie in a syn configuration with respect to each other.

Among the polycarboxylic acid esters which may be employed as inside electron donors may be mentioned dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amy phthalate, dineopentyl phthalate, di-2-ethylhexyl phthalate, di-2-ethyldecyl phthalate, diethyl-1,2-fluorenedicarboxylate, diisopropyl-1,2-ferrocenedicarboxylate, cis-diisobutyl-cyclobutane-1,2-dicarboxylate, endo-diisobutyl-5-norbornene-2,3-dicarboxylate and endo-diisobutylbicyclo[2.2.2]oct-5-ene-2,3-dicarboxylate, diisobutyl maleate, diisoamyl citraconate, and the like. Diisobutyl phthalate is most preferred.

The alcohols employed to produce the polycarboxylic acid esters employed as inside electron donors in the solid catalyst component contain from 1 to 12 carbon atoms, usually 3 to 12 carbon atoms, and preferably 4 to 12 carbon atoms. If desired, the alcohol employed may be substituted with one or more substituents which are inert under the reaction conditions employed during esterification, as well as during preparation of the solid catalyst component and polymerization with such catalyst component. Suitable alcohols include ethyl alcohol, n-propyl alcohol, isopropyl alcohol, isobutyl alcohol, tert-butyl alcohol, isoamyl alcohol, tert-amyl alcohol, 2-ethylhexyl alcohol, 2-ethyldecyl alcohol, and the like. Isobutyl alcohol is most preferred.

The aromatic compounds employed to produce the polycarboxylic acid esters employed as inside electron donors in the solid catalyst component contain two carboxyl groups which are attached to ortho carbon atoms of the ring structure. These compounds contain at least 8 carbon atoms, usually 8 to 20 carbon atoms, and preferably 8 to 16 carbon atoms. Although preferably monocyclic, they may contain more than one aromatic ring. If desired, they may be substituted with one or more substituents which are inert under the reaction conditions employed during esterification, as well as during preparation of the solid catalyst component and polymerization with such catalyst component. Suitable aromatic compounds include phthalic acid (1,2-benzenedicarboxylic acid), 2,3-naphthalenedicarboxylic acid, 1,2-anthracenedicarboxylic acid, 1,2-fluorenedicarboxylic acid, 3,4-fluorenedicarboxylic acid, 1,2-ferrocenedicarboxylic acid, and the like.

The non-aromatic cyclic compounds employed to produce the polycarboxylic acid esters employed as inside electron donors in the solid catalyst component contain two carboxyl groups which are attached to vicinal carbon atoms of the ring structure and which lie in a syn configuration with respect to each other. Both monocyclic and polycyclic compounds are suitable. These compounds contain at least 6 carbon atoms, usually 6 to 20 carbon atoms, and preferably 6 to 10 carbon atoms. If desired, they may be substituted with one or more substituents which are inert under the reaction conditions employed during esterification, as well as during preparation of the solid catalyst component and polymerization with said catalyst component. Suitable cyclic compounds include cis-cyclobutane-1,2-dicarboxylic acid, endo-5-norbornene-2,3-dicarboxylic acid, endo dicyclopentadiene-2,3-dicarboxylic acid, endobicyclo[2.2.2]oct-5-ene-2,3-dicarboxylic acid, endobicyclo[3.2.1]oct-2-ene-6,7-dicarboxylic acid, and the like.

The unsaturated aliphatic compounds employed to produce the polycarboxylic acid esters employed as inside electron donors in the solid catalyst component contain two carboxyl groups which are attached to vicinal double bonded carbon atoms and which lie in a syn configuration with respect to each other. These compounds contain at least 6 carbon atoms, usually 6 to 20 carbon atoms, and preferably 6 to 10 carbon atoms. If desired, they may be substituted with one or more substituents which are inert under the reaction conditions employed during esterification, as well as during preparation of the solid catalyst component and polymerization with said catalyst component. Suitable compounds include maleic acid, citraconic acid, and the like.

Halogenation of the magnesium compound with the halogenated tetravalent titanium compound is effected employing an excess of the titanium compound. At least 2 moles of the titanium compound should ordinarily be employed per mole of the magnesium compound. Preferably from 4 moles to 100 moles of the titanium compound are employed per mole of the magnesium compound and most preferably from 4 moles to 20 moles of the titanium compound are employed per mole of the magnesium compound.

Halogenation of the magnesium compound with the halogenated tetravalent titanium compound, as noted, is conducted in the presence of a halohydrocarbon and a polycarboxylic acid ester containing two coplanar ester groups attached to adjacent carbon atoms. The halohydrocarbon is employed in an amount sufficient to dissolve the titanium compound and the ester, and to adequately disperse the solid, insoluble magnesium compound. Usually the dispersion contains from 0.005 to 2.0 moles of the solid magnesium compound per mole of halohydrocarbon, preferably form 0.01 to 1.0 mole of the solid magnesium compound per mole of the halohydrocarbon. The polycarboxylic acid ester, which, as previously noted, serves as an inside electron donor, is employed in an amount sufficient to provide a molar ratio of said compound to the titanium compound of from 0.0005:1 to 2.0:1, preferably of from 0.01:1 to 2.0:1.

Halogenation of the magnesium compound with the halogenated tetravalent titanium compound can be effected at a temperature of from 60° C. to 150° C., preferably from 70° C. to 120° C. Usually the reaction is allowed to proceed over a period of 0.1 to 6 hours, preferably between 0.5 and 3.5 hours. For convenience, halogenation is usually effected at atmospheric pressure, although higher and lower pressures can be employed if desired. The halogenated product, like the starting magnesium compound, is a solid material which can be isolated from the liquid reaction medium by filtration, decantation or other suitable method.

After the solid halogenated product has been separated from the liquid reaction medium, it is treated one or more times with additional halogenated tetravalent titanium compound in order to remove residual alkoxy and/or aryloxy groups and maximize catalyst activity. Preferably, the halogenated product is treated at least twice with separate portions of the halogenated tetravalent titanium compound. As in the initial halogenation, at least 2 moles of the titanium compound should ordinarily be employed per mole of the magnesium compound, and preferably from 4 moles to 100 moles of the titanium compound are employed per mole of the magnesium compound, most preferably from 4 moles to 20 moles of the titanium compound per mole of the magnesium compound.

Generally, the reaction conditions employed to treat the solid halogenated product with the titanium compound are the some as those employed during the initial halogenation of the magnesium compound, although it is not necessary that the polycarboxylic acid ester be present during this treatment. The halohydrocarbon is usually employed, however, to dissolve the titanium compound and disperse the solid halogenated product. Usually the dispersion contains from 0.005 to 2.0 gram atoms of magnesium per mole of halohydrocarbon, preferably from 0.01 to 1.0 gram atoms of magnesium per mole of halohydrocarbon.

As stated above, the halogenated product is preferably treated at least twice with separate portions of the halogenated tetravalent titanium compound. In order to assist in the removal of residual alkoxy and/or aryloxy moiety from the halogenated product, the second such treatment may be effected in the presence of a polycarboxylic acid halide containing two coplanar acid halide groups attached to adjacent carbon atoms. While it is possible to employ the acid halide separately, for convenience it is preferable to employ it together with the titanium compound dissolved in the halohydrocarbon. Should circumstances warrant such procedure, however, the halogenated product may be treated with the acid halide before or after it is treated with the titanium compound for the second time. In any event, from 5 mmol to 200 mmol of the acid halide are generally employed per gram atom of magnesium of the halogenated product.

The polycarboxylic acid halides employed can be prepared by reacting a hydrogen halide with any of the polycarboxylic acids employed to prepare the polycarboxylic acid esters employed as inside electron donors in the solid catalyst component. Preferably, the halide moiety of such acid halides is chloride or bromide, most preferably chloride, and the polycarboxylic acid moiety corresponds to the polycarboxylic acid moiety of the inside electron donor employed in the preparation of the solid catalyst component. Suitable acid halides include phthaloyl dichloride, 2,3-naphthalenedicarboxylic acid dichloride, endo-5-norbornene-2,3-dicarboxylic acid dichloride, maleic acid dichloride, citraconic acid dichloride, and the like.

After the solid halogenated product has been treated one or more times with additional halogenated tetravalent titanium compound, it is separated from the liquid reaction medium, washed with an inert hydrocarbon to remove unreacted titanium compounds, and dried. The final washed product suitably has a titanium content of from 0.5 percent by weight to 6.0 percent by weight, preferably from 2.0 percent by weight to 4.0 percent by weight. The atomic ratio of titanium to magnesium in the final product is suitably between 0.01:1 and 0.2:1, preferably between 0.02:1 and 0.1:1. The polycarboxylic acid ester is present in a ratio of ester to magnesium of from 0.005:1 to 10.0:1, preferably from 0.02:1 to 2.0:1. A particularly advantageous composition uses dialkyl phthalates with a phthalate/titanium mole ratio from 1:1 to 1.75:1. Higher phthalate levels can be used; however, the use of phthalate/titanium mole ratios much above 1.75:1 can result in formation of insoluble phthalate·$TiCl_4$ complexes which do not add to polymerization activity but do result in higher titanium residues. The organoaluminum compound employed as cocatalyst in the catalyst system employed in the process of the invention may be chosen from any of the known activators of olefin polymerization catalyst systems employing a titanium halide. Trialkylaluminum compounds, however, are preferred, particularly those wherein each of the alkyl groups contain from 1 to 6 carbon atoms. Suitable organoaluminum cocatalysts include compounds having the formula $$Al(R'')_dX_eH_f$$

wherein:

X is F, Cl, Br, I or OR''''

R''' and R'''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and d+e+f=3.

Such activator compounds can be employed individually or in combination thereof and include compounds such as $Al(C_2H_5)_3$, $Al(CH_3)_3$ $Al(C_2H_5)_2Cl$, $Al_2(C_2H_5)_3Cl_3$, $Al(C_2H_5)_5H$, $Al(C_2H_5)_2(OC_2H_5)$, $Al(i\text{-}C_4H_9)_3$, $Al(i\text{-}C_4H_9)_2H$, $Al(C_6H_{13})_3$ and $Al(C_8H_{17})_3$.

The silicon compounds which serve as the outside electron donor in the catalyst system employed in the process of the invention contains at least one silicon-oxygen-carbon linkage. Suitable silicon compounds include compounds having the formula $$R^1{}_2Si(OR^2)_2$$

wherein each $R^1$ is individually a cycloalkyl having 4 to 7 carbon atoms or a substituted or unsubstituted cycloaliphatic group having 4 to 20 carbon atoms and each $R^2$ is individually a hydrocarbon group of 1 to 20 carbon atoms.

Polymers of the present invention are prepared in a fluidized bed polymerization reactor, by continuously contacting propylene with the three components of the catalyst system, i.e., the solid catalyst component, cocatalyst and outside electron donor.

A third electron donor has the formula $$Si(OR^3)_4$$

where each $R^3$ can be the same or different and is a hydrocarbon group of 1 to 20 carbon atoms. Preferably, the third electron donor is tetraethoxysilane. This third electron donor is used in the second polymerization step in the process of the invention. This second silane is used, preferably, in a ratio to the second (external or outside) electron donor of 0.1–10 moles $Si(OR^3)_4$/mole $R^1{}_2Si(OR^2)_2$.

In accordance with the process, discrete portions of the catalyst components are continually fed to the reactor in catalytically effective amounts together with the alpha-olefin while the polymer product is continually removed during the continuing process. Fluid bed reactors suitable for continuously polymerizing alpha-olefins have been previously described and are well known in the art. Fluid bed reactors useful for this purpose are described, e.g., in U.S. Pat. Nos. 4,302,565, 4,302,566 and 4,303,771, the disclosures of which are incorporated herein by reference.

The solid catalyst component, cocatalyst, and selectivity control agent can be introduced into the polymerization reactor through separate feed lines or, if desired, two or all of the components may be partially or completely mixed with each other before they are introduced into the reactor. In either event, the cocatalyst and the selectivity control agent are employed in such amounts as to provide an atomic ratio of aluminum in the cocatalyst to silicon in the selectivity control agent of from 0.2:1 to 100:1, preferably from 0.5:1 to 10:1, and the cocatalyst and the solid catalyst component are employed in such amounts as to provide an atomic ratio of aluminum in the cocatalyst to titanium in the solid catalyst component of from 5:1 to 300:1, preferably from 10:1 to 200:1.

Both the cocatalyst and the selectivity control agent may be introduced into the reactor dissolved in an inert liquid solvent, i.e., a solvent which is nonreactive with all the components of the catalyst composition and all other active components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the selectivity control agent. If desired, less concentrated or more concentrated solutions can be employed, or, alternatively, the cocatalyst and the selectivity control agent can be added in the absence of solvent, or, if desired, suspended in a stream of liquefied monomer. When a solvent is employed, however, the amount of solvent introduced into the reactor should be carefully controlled so as to avoid the use of excessive quantities of liquid which would interfere with the operation of the fluidized bed.

The solvents employed to dissolve the co-catalyst and the selectivity control agent may also be employed to introduce the solid catalyst component into the reactor. While the solid catalyst component may also be introduced into the reactor in the absence of solvent or suspended in liquefied monomer, such solvents are preferably employed to disperse the solid catalyst component and facilitate its flow into the reactor. Such dispersions generally contain from 1 weight percent to 75 weight percent of the solid component.

The polymerization can be conducted using gas phase, slurry, or solution processes; however, the polymerization in the second reactor is preferably carried out in the gas phase. For gas phase polymerizations, fluidized bed reactors are the reactors of choice.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomers and, if desired, modifiers and/or an inert carrier gas.

The essential parts of the reaction system are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

The fluidized bed reactors are operated at a temperature in the range of about 40° C. to about 150° C. and preferably about 50° C. to about 120° C. and a pressure of about 50 psig to about 700 psig and preferably about 250 psig to about 550 psig. The velocity of the fluidizing gas is in the range of about 0.1 to about 3.0 feet per second and preferably about 0.5 to about 2.0 feet per second. The weight flow ratio of monomer to catalyst in the first reactor is about 1000:1 to about 100,000:1 and is preferably about 10,000:1 to about 100,000:1.

In the first reactor, for example, propylene or a mixture of propylene and at least one alpha-olefin having 2 to 8 carbon atoms is introduced together with hydrogen and catalyst into the first reactor. The alpha-olefin components can be, for example, ethylene, 1-butene, 1-pentene, 1-hexene, or various mixtures of alpha-olefin. The mole ratio of alpha olefin to propylene is about 0 to about 0.06 and, preferably, when present, is about 0.015 to about 0.04 in the reaction gas composition. The mole ratio of hydrogen to propylene alone or combined propylene and alpha-olefin is in the range of about 0.001 to about 0.45 and is preferably about 0.004 to about 0.1.

The combination of components and conditions, previously mentioned, lead to a mixture of homopolymer or copolymer of propylene together with active catalyst embedded in the polymer matrix. This mixture from the first reactor is transferred to the second reactor to which no additional solid catalyst is added. Additional cocatalyst is optionally added to the second reactor, however this second addition of cocatalyst is not critical to the effect of this invention. The third electron donor compound is added to the second reactor. This second silane is used, preferably, in a ratio to the outside (second or external) electron donor of 0.1:10 molar ratio to the second electron donor which was injected into the first reactor and most preferably in a ratio of 0.2:2 moles $Si(OR^3)_4$/mole $R^1{}_2Si(OR^2)_2$.

In the second reactor, for example, ethylene and propylene are maintained at a gas phase composition in a range of mole ratio of about 0.1 to about 10 moles of ethylene per mole of propylene, and preferably about 0.1 to about 5.0 moles of ethylene per mole of propylene. The combined ethylene/propylene addition is sufficient to provide a copolymer fraction of about 8 to about 50 percent by weight of copolymer based on the weight of the total product, and preferably a copolymer fraction of about 10 to about 30 percent by weight. The product, i.e., the final product, is an ethylene/propylene copolymer incorporated into a matrix of propylene homopolymer or copolymer. When monomers other than ethylene are employed, the process of the invention is conducted similarly. Hydrogen is also introduced into the second reactor together with the ethylene and propylene. The mole ratio of hydrogen to combined ethylene and propylene in the gas phase is about 0.001 to about 1.0 and is preferably about 0.03 to about 0.1. It should be noted that some or all of the propylene or hydrogen or other alpha-olefin in the second reactor can come from the first reactor. The two reactors are operated continuously, in series.

With reference to FIG. 1, catalyst is fed to Reactor 1 (1). Selectivity control agent (2) and triethylaluminum (4) are fed to the recycle line. Monomers (3) are fed to the recycle line upstream of the compressor (5) and coder (6). Gas flows upwardly through the bed. Product is removed from the reactor by opening valve A and allowing granular product to enter the inter-reactor transfer tank (9) which is at a lower pressure than Reactor 1. Valve A is then closed. Monomer may be purged if desired from the product in the inter-reactor transfer tank by opening valves F and C and allowing nitrogen (7) to flow to vent (8). Valves F and C are dosed and the inter-reactor transfer tank is pressurized with gas via a gas line (13) from Reactor 2 (21) by opening valves B, E and D. Valves E and D are then closed and valve G opened, transferring the contents from the inter-reactor transfer tank to Reactor 2. Valves B and G are closed. Valve C is opened to reduce the pressure in the inter-reactor transfer tank and then closed. The transfer cycle can now begin again.

Product enters Reactor 2 through valve G. Additional selectivity control agent (15) is fed directly to the bed. Additional monomers (14) are fed into the recycle line. Additional aluminum alkyl (16) may optionally be fed to the reactor. Recycle gas enters the compressor (11) and is cooled in cooler (12).

Copolymer product exits Reactor 2 into the product discharge tank (19) by opening valve H and allowing product to enter the product discharge tank which is at lower pressure than Reactor 2. Valve H is closed and valves I and J are opened allowing nitrogen (17) to purge the polymer product to vent (18). Valve J is closed, then valve I, allowing for a slight pressure buildup in the product discharge tank. Valve K is then opened allowing product (20) to exit the product discharge tank.

The introduction of alpha-olefin comonomer into the first reactor results in final products with somewhat lower stiffness (Flexural Modulus), but with some gain in Izod Impact Strength.

Additional advantages of subject process are that the product is not sticky and does not foul the apparatus, and high melting points and stiffness are achieved.

The impact polypropylene copolymer has the following physical properties:

(i) the Gardner Impact Strength is at least 80 inch pounds as measured by ASTM D3029, Condition G, at −30° C. on a ⅛ inch thick injection molded disc;

(ii) Sequence Index: The sequence index is a measure of the randomness of the impact modifying polymer produced in the second reactor. Highly random polymers have sequence indices of about 1.0 to about 1.3. Less random polymers have a sequence index of greater than 1.3. Random polymers are less sticky in the second reactor and less prone to fouling.

Polymers produced in accordance with the process of the present invention have a melt flow rate of from 0.1 g/10 minutes to about 1000 g/10 minutes, preferably of from about 1 g/10 minutes to about 50 g/10 minutes. The melt flow of a polymer varies inversely with its molecular weight. The process of the present invention produces polymers which are granular materials having an average particle size of from about 0.01 to about 0.30 centimeters, usually of from about 0.02 to about 0.13 centimeters, in diameter. The particle size is important for the purpose of readily fluidizing the polymer particles in the fluid bed reactor. In accordance with the process of the present invention the polymers produced have a bulk density of from about 200 kilograms per cubic meter to about 550 kilograms per cubic meter.

The following Examples are designed to illustrate the process of the present invention and are not intended as a limitation upon the scope thereof.

EXAMPLES

The properties of the polymers produced in the Examples were determined by the following test methods:

Melt Flow Rate (MFR): ASTM D-1238, Condition L at 230° C. with a 2.16 kg load. The results are reported as grams per 10 minutes.

Productivity: A weighed sample of the polymer product is converted to ash, and the titanium content of the ash is determined spectrophotometrically. Productivity is reported as kilograms of polymer produced per gram of titanium in the polymer. When a batch polymerization is employed, productivity is determined from the known amount of titanium introduced into the reactor.

Isotactic Index: A sample is weighed, extracted with refluxing in heptane for at least 4 hours. The insoluble polymer extract is thoroughly dried and weighed. The percentage of polymer insoluble under the extraction conditions is reported as the isotactic index (II). The isotactic index of a polymer (II) may be used to estimate the xylene soluble content of the polymer. In the case of propylene homopolymer, xylene solubles is approximately equal to 63.2−(0.629×II).

Xylene Solubles: A sample is weighed and completely dissolved in xylene in a flask by heating under reflux at 120° C. with stirring. The flask is then immersed in a water bath at 25° C. for one hour, during which time the insoluble polymer precipitates. The precipitate is filtered, and the amount of soluble polymer present in the filtrate is determined by evaporating a 100 ml aliquot of the filtrate, drying the residue under vacuum, and weighing the residue. The xylene-soluble content consists of amorphous material with some low molecular weight crystalline material. The xylene-soluble content of a polymer (XS) may be used to estimate the isotactic index of the polymer. In the case of propylene homopolymer, isotactic index is approximately equal to (63.2 XS)/0.629.

1% Secant Modulus: This is the 1% secant flexural modulus$\times 10^{-5}$. The result is given in psi (pounds per square inch). The test used is ASTM D790, Method A.

Notched Izod Impact Strength: at 23° C. and 0° C. The result is given in foot-pounds per inch. The test used is ASTM D256.

Gardner Impact Strength (−30° C.): The result is given in inch-pound. The test used is ASTM D3029; Condition G.

Sequence Index (SI) is a measurement of how randomly the ethylene inserts in the rubber portion of the polymer. A perfectly random ethylene insertion would have a sequence index of 1. As the sequence index increases, the ethylene insertion becomes more blocky, i.e. has relatively more of EEP and EEE sequences. The granular product is separated into two portions using xylene. A sample is weighed and completely dissolved in xylene in a flask by heating under reflux at 120° C. with stirring. The flask is immersed in a water bath at 25° C. for one hour, during which time the insoluble polymer precipitates. The mixture is filtered with the insoluble fraction remaining on the filter and dried overnight in a hood, letting the majority of the xylene evaporate. The portion that was insoluble in xylene contained crystalline material such as homopolymer polypropylene and homopolymer polyethylene. The xylene soluble portion contained rubber material (non-crystalline), non-isotactic material and

* * * * *

UNITED STATES PATENT OFFICE
PTO - BOYERS, PA DUTY STATION

---

MISSING PAGE TEMPORARY NOTICE

PATENT NUMBER H 1722 FOR THE ISSUE DATE OF 4/7/1998 HAS BEEN SCANNED, BUT CONTAINS A MISSING PAGE TEMPORARY NOTICE. UPON RECEIPT OF THE MISSING PAGE(S), THE ENTIRE DOCUMENT WILL BE RESCANNED. IF YOU HAVE ANY QUESTIONS, PLEASE CONTACT DENEISE BOYD OF THE DATA MAINTENANCE BRANCH DATA CENTER OPERATIONS DIVISION (DMB) BY E-MAIL AT HER ADDRESS DENEISEBOYD@USPTO.GOV OR BY PHONE (703) 306-3116.

THIS NOTICE IS FOR THE MISSING PAGE CONTAINING:

Column 13 to end

DATA CONVERSION OPERATION
BOYERS, PA